US011216665B2

United States Patent
Drake et al.

(10) Patent No.: US 11,216,665 B2
(45) Date of Patent: Jan. 4, 2022

(54) REPRESENTATION OF REAL-WORLD FEATURES IN VIRTUAL SPACE

(71) Applicant: Disney Enterprises, Inc., Burbank, CA (US)

(72) Inventors: Corey D. Drake, Sunland, CA (US); Timothy M. Panec, Studio City, CA (US); Tritia V. Medrano, Rowland Heights, CA (US); Stephen A. Thornton, Burbank, CA (US); Jason A. Yeung, Glendale, CA (US); Nathan D. Nocon, Valencia, CA (US); Elliott H. Baumbach, Porter Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/541,910

(22) Filed: Aug. 15, 2019

(65) Prior Publication Data
US 2021/0049361 A1 Feb. 18, 2021

(51) Int. Cl.
| *G06K 9/00* | (2006.01) |
| *G06F 16/58* | (2019.01) |
| *G06T 7/70* | (2017.01) |
| *H02J 50/20* | (2016.01) |
| *H04W 4/021* | (2018.01) |
| *H04L 29/08* | (2006.01) |
| *G06T 19/00* | (2011.01) |

(52) U.S. Cl.
CPC ..... *G06K 9/00671* (2013.01); *G06F 16/5866* (2019.01); *G06T 7/70* (2017.01); *G06T 19/006* (2013.01); *H02J 50/20* (2016.02); *H04L 67/12* (2013.01); *H04W 4/021* (2013.01)

(58) Field of Classification Search
CPC .......... G06K 9/00671; G06F 16/5866; H04W 4/021; H04L 67/12; G06T 19/006; G06T 7/70; H02J 50/20
See application file for complete search history.

(56) References Cited

U.S. PATENT DOCUMENTS

| 8,797,321 | B1 * | 8/2014 | Bertolami | G06T 15/50 |
| | | | | 345/426 |
| 10,403,103 | B1 * | 9/2019 | Kugler | G08B 29/046 |
| 2005/0073531 | A1 * | 4/2005 | Kuroki | G06T 19/006 |
| | | | | 345/633 |
| 2008/0211813 | A1 * | 9/2008 | Jamwal | G06T 15/60 |
| | | | | 345/426 |
| 2011/0316845 | A1 * | 12/2011 | Roberts | G06T 19/006 |
| | | | | 345/419 |

(Continued)

FOREIGN PATENT DOCUMENTS

JP 2012083847 A * 4/2012

*Primary Examiner* — William A Beutel
(74) *Attorney, Agent, or Firm* — Patterson + Sheridan, LLP (57) ABSTRACT

Embodiments provide for an augmented reality (AR) system able to track the movement of real-world objects and apply that movement to virtual objects. The AR system includes a radio configured to receive first sensor data from a sensor attached to a first physical object in physical space. The AR system further includes a processor configured to determine when a physical object changes from a first state to a second state object based on the first sensor data, and update an environmental map based on the change from the first state to the second state of the first physical object.

19 Claims, 7 Drawing Sheets

(56) References Cited

U.S. PATENT DOCUMENTS

| | | | |
|---|---|---|---|
| 2015/0130790 A1* | 5/2015 | Vasquez, II | G06T 19/006 |
| | | | 345/419 |
| 2018/0114124 A1* | 4/2018 | Cronn | A61B 5/165 |
| 2018/0144525 A1* | 5/2018 | Gutierrez | G06T 19/003 |
| 2018/0356881 A1* | 12/2018 | Belverato | G06F 13/387 |
| 2019/0179426 A1* | 6/2019 | Ojala | H03M 13/3761 |

* cited by examiner

REPRESENTATION OF REAL-WORLD FEATURES IN VIRTUAL SPACE

BACKGROUND

In many instances, one or more mapping algorithms are utilized to generate and/or update environmental maps utilized by an augmented reality (AR) system. The mapping algorithms generate virtual depictions of real-world objects within the environmental maps. One example mapping algorithm is a simultaneous localization and mapping (SLAM) algorithm. However, the mapping algorithms are often unable to properly map moving real-world objects, resulting in artifacts and/or misrepresented real-world objects. For example, an AR object may not be moved or moved too slowly in response to movement of a corresponding real-world object, resulting in a poor user experience. In some instances, tracking system may be utilized to track the movement of real-world objects and aid in updating environmental maps. However, these tracking systems are expensive and complex, limiting the possible applications in which such tracking systems may be utilized.

SUMMARY

In one embodiment, a method for updating an environmental map of an augmented reality (AR) system comprises receiving first sensor data from a sensor attached to a first physical object in physical space and determining a change from a first state to a second state of the first physical object based on the first sensor data. The method further comprises updating the environmental map based on the change from the first state to the second state of the first physical object, and updating a presentation based on the updated environmental map.

A non-transitory computer-readable medium containing computer program code that, when executed by operation of one or more computer processors, performs an operation comprising receiving first sensor data from a sensor attached to a first physical object in physical space, determining a change from a first state to a second state of the first physical object based on the first sensor data, updating an environmental map based on the change from the first state to the second state of the first physical object, and displaying the updated environmental map on a display of an augmented reality system.

An augmented reality system comprising a display, a radio and a processor. The radio is configured to receive first sensor data from a sensor attached to a first physical object in physical space. The processor is configured to determine a change from a first state of the physical object to a second state of the first physical object based on the first sensor data, and update an environmental map based on the change from the first state to the second state of the first physical object. The processor is further configured to display the updated environmental map on the display.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Gathering information and generating AR depictions of real-world objects is difficult as current AR algorithms are slow to respond to the change in position of real-world objects—e.g., opening or closing of a door or the change in a lighting condition. However, sensors may be placed on real-world objects and used to communicate position information for the real-world objects to an AR system. The corresponding sensor data may be used to determine the position or the change in position of the real-world objects which may be used to more accurately update an environmental map. Through the use of dedicated sensors, AR applications may update environmental maps without the use of complicated and slow to respond mapping algorithms.

Figure 1:
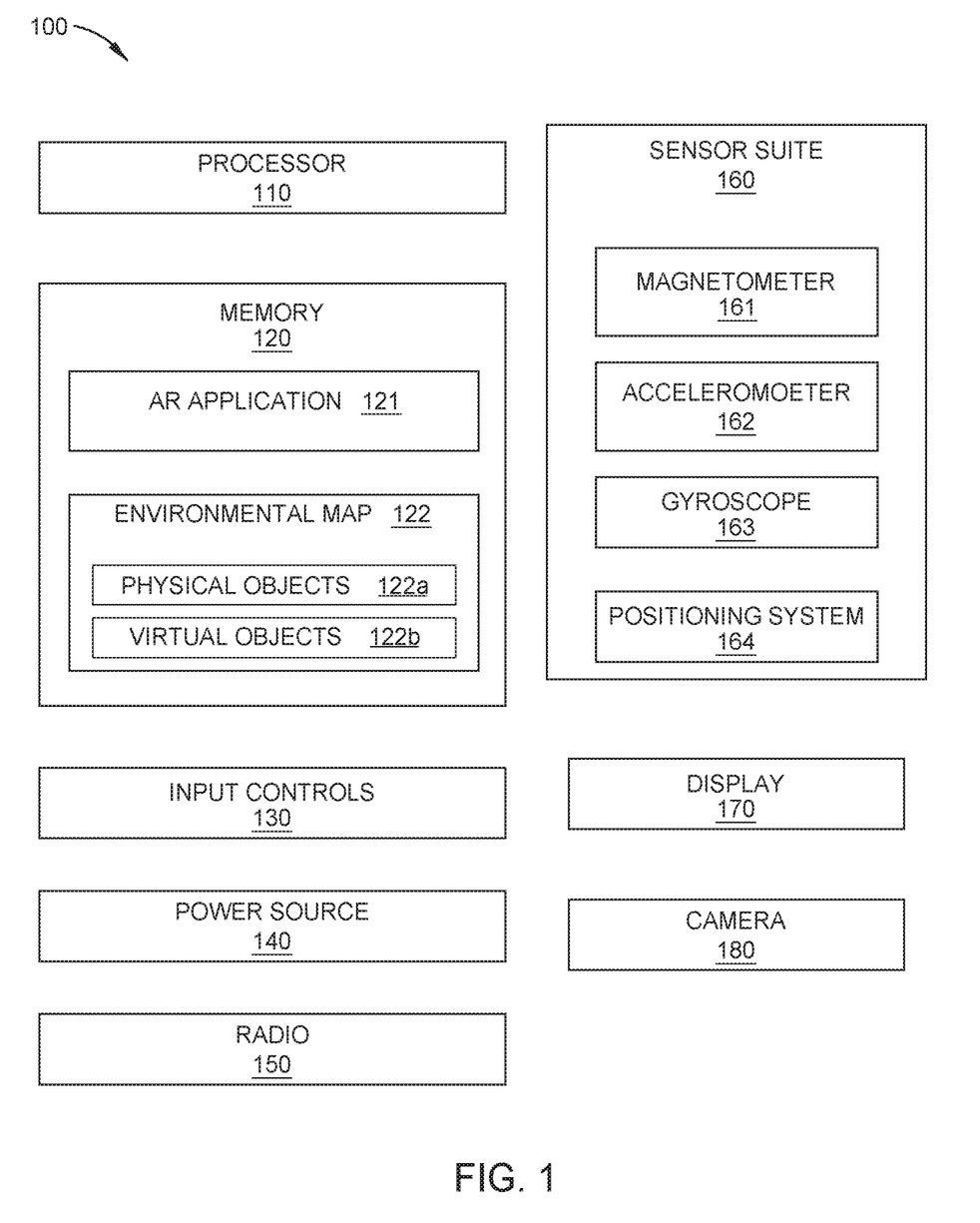
FIG. 1 is a schematic representation of an augmented reality system, according to one or more embodiments.

FIG. 1 illustrates an AR system 100. The AR system 100 includes a processor 110, a memory 120, and various hardware elements to provide a user with an AR experience. In various embodiments, the AR system 100 may be an AR headset or a general computing device (e.g., a smart phone, a tablet computer, a laptop computer) that provides an AR experience.

The processor 110 and the memory 120 provide computing functionality to the AR system 100. The memory 120 may be one or more memory devices, such as, for example, Random Access Memory (RAM), Read Only Memory (ROM), flash memory, or any other type of volatile or non-volatile storage medium that includes instructions that the processor 110 may execute. The processor 110 may process data received from one or more elements of the AR system 100. For example, the processor 110 may executes commands based on inputs received from the input controls 130. Further, the processor 110 may instruct the display 170 to display an updated environmental map based on sensor data received by the radio 150. In various embodiments, the processor 110 may be processor capable of performing the functions described herein. In one embodiment, the processor 110 is a general processing computer, such as a central processing unit (CPU) of the AR system 100. Further, the processor may be an application specific integrated controller (ASIC).

The memory 120 generally includes program code for performing various functions related providing an AR experience to a user. The program code is generally described as various functional "applications" or "modules" within the memory 120, although alternate implementations may have different functions or combinations of functions. The memory 120 also generally includes data structures that may store information for use by the various program code modules also stored thereon. For example, the memory 120 includes program code for an AR application 121 and data structures for environmental maps 122. Further, other applications and data structures may also be included by the memory 120.

The AR application 121 is generally configured to provide functionality to overlay AR objects onto a video feed of the environment. In some embodiments, the code for the AR application 121 is provided to manage commands sent to and data feeds received from one or more remote devices (e.g., a sensor 210 discussed in greater detail in relation to FIG. 2) as well as various sensors included in a sensor suite 160 of the AR system 100.

In various embodiments, the AR application 121 is provided one or more environmental maps 122 to aid in providing the AR experience to a user. The AR application 121 may generate or update the environmental maps 122 at startup of the AR system 100 or in response to a command or sensor data received from a remote device (e.g., the sensor 210). Generating and/or updating the environmental maps 122 may include overlaying one or more AR objects within the environmental maps and/or updating the position of one or more AR objects within the environmental maps. Environmental maps 122 include positional data for various real-world and virtual objects for use in the AR experience by the AR application 121. The positional data may be indicated via relative coordinates (e.g., X meters from another object, X meters from the AR system 100) or by absolute coordinates (e.g., at latitude X and longitude Y), include positions of various components of the object (e.g., facial expressions, poses/limb positions, open/closed statuses), and include orientations of the object in the environment (e.g., facing X direction). Various real-world objects (e.g., physical objects 122a) may be classified and identified in the environmental map 122 (e.g., a tree, a road, a wall, a door, a person, etc.) via image recognition or signals transmitted (e.g., a sensor data transmitted by a sensor 210 attached to the object) and depicted as virtual objects 122b.

The AR system 100 includes one or more input controls 130 to receive input from a user to control the AR experience. The input controls 130 may include physical joysticks, physical steering wheels/yokes, physical buttons, physical switches, microphones, and a touch interface that designates various regions for use as virtual joysticks, buttons, switches, etc. A user may manipulate the various input controls 130 to signal the AR application 121 to alter the AR experience, select from various environmental maps 122, shut down the AR system 100, switch to a different application, change system settings (e.g., volume, brightness), etc. In one embodiment, the input controls 130 may be separate from one or more other elements of the AR system 100. For example, the input controls 130 may be separate from the display 170 and/or the sensor suite 160.

The power source 140 provides electric power to the various components of the AR system 100. Various examples of power sources 140 include batteries (rechargeable and non-rechargeable), Alternating Current to Direct Current (AC/DC) converters, Direct Current to Alternating Current (DC/AC) converters, transformers, capacitors, inductors, and wiring to connect to an external power source 140.

The radio 150 provides wireless communications for the AR system 100. In various embodiments, the radio 150 is a transmitter and/or receiver, which receives signals from external sources and transmits signals to external devices. The radio 150 may be in communication with various antennas and transmit and receive messages according to various standards, such as, Bluetooth, Bluetooth Low Energy, Wi-Fi, or a proprietary standard, among others. The radio 150 may include receiver circuitry that is configured to receive signals from the one or more remote devices (e.g., the sensor 210). The receiver circuitry may be wireless receiver circuitry.

The sensor suite 160 includes a magnetometer 161, an accelerometer 162, a gyroscope 163, and a positioning system 164, among other sensors. In various embodiments, the sensor suite 160 may additionally, or alternatively, include line of sight sensors, e.g., light-based markers and sensors. Further, the sensor suite 160 may additionally, or alternatively, include one or more of Hall Effect sensor, capacitive sensor, a compass, a color sensor, a light sensor, a potentiometer, and an optical tracking device, or the like. The sensor suite 160 may include additional sensors, several instances of each sensor, or may omit some of the example sensors discussed herein. The magnetometer 161 is a sensor that provides a bearing to a north pole of a magnetic field in the environment in which the AR system 100 is present. The magnetometer 161 may thus provide the AR system 100 with a directional sense in terms of yaw orientation with respect to magnetic north. The accelerometer 162, which measures acceleration forces acting on the AR system 100, may provide the AR system 100 with information of whether the AR system 100 (or a portion thereof) is moving, and in which direction(s). The gyroscope 163 measures orientation of the AR system 100 (or a portion thereof), and may provide the AR system 100 with information of whether the AR system 100 (or portion thereof) is level or to what degree the AR system 100 is tilted in one or more planes. The combination of the accelerometer 162 and gyroscope 163 may thus provide the AR system 100 with a direction sense in terms of pitch and roll with respect to gravity. The positioning system 164 may provide absolute positioning information (e.g., via a Global Positioning System (GPS) receiver) and relative positioning information (e.g., via a range finder, a camera sensor including image recognition software to identify objects and distances thereto based on known sizes).

In some embodiments, the AR application 121 uses the sensor suite 160 and/or data received from a remote device (e.g., the sensor 210) to build or update the environmental map 122, to determine where the AR system 100 is located on an existing environmental map 122, and to identify when to display AR objects to the user on a display 170 of the AR system 100.

The display 170 includes one or more devices used to output AR objects or a video feed to a user. In one example, the display 170 includes a projector and a transparent/translucent surface onto which AR images are projected by the projector and through with a user may view the environment into which the AR objects are inserted. In another example, a Liquid Crystal Display (LCD), Light Emitting Diode (LED), or other display technology is used to present a video feed into which AR objects have been programmatically inserted or overlaid for output to the user. In one or more embodiments, two displays 170 are provided, one for each eye of a user, such that the user is provided three-dimensional AR objects in the field of view. In one or more embodiments, the display 170 is transparent such that physical objects 122a (or real-world objects) are visible through the display 170. In such an embodiment, one or more virtual objects 122b may be overlaid on the physical objects 122a and displayed on the display 170.

A camera 180 is optionally included or activated in the AR system 100 to provide a video feed over which AR objects may be overlaid or into which AR objects may be programmatically inserted. The camera 180 may be omitted or deactivated in embodiments that use an external device to provide a video feed or a transparent surface that a user may view the environment through. In various embodiments, the camera 180 is provided in conjunction with image recognition software (stored on the memory 120) to identify various real-world objects in the field of view, which once identified may be used by the AR application 121 for inclusion in an environmental map 122 or as an anchor point for an AR object output to the user on the display 170.

Additional Input/Output (I/O) devices may be included in various embodiments of an AR system 100. The additional I/O devices may include various lights, displays, and speakers (e.g. LEDs, IR transmitter/receivers, speaker, buttons, microphones, light sensors, etc.) for providing output from the AR system 100 in addition to that provided by the display 170 or radio 150. For example, a speaker is an I/O device 190 that provides audio output (e.g., of an audio component of a video feed or an AR sound effect). Further, the additional I/O devices may include a transmitter or a transceiver for communicating with other devices.

Figure 2:
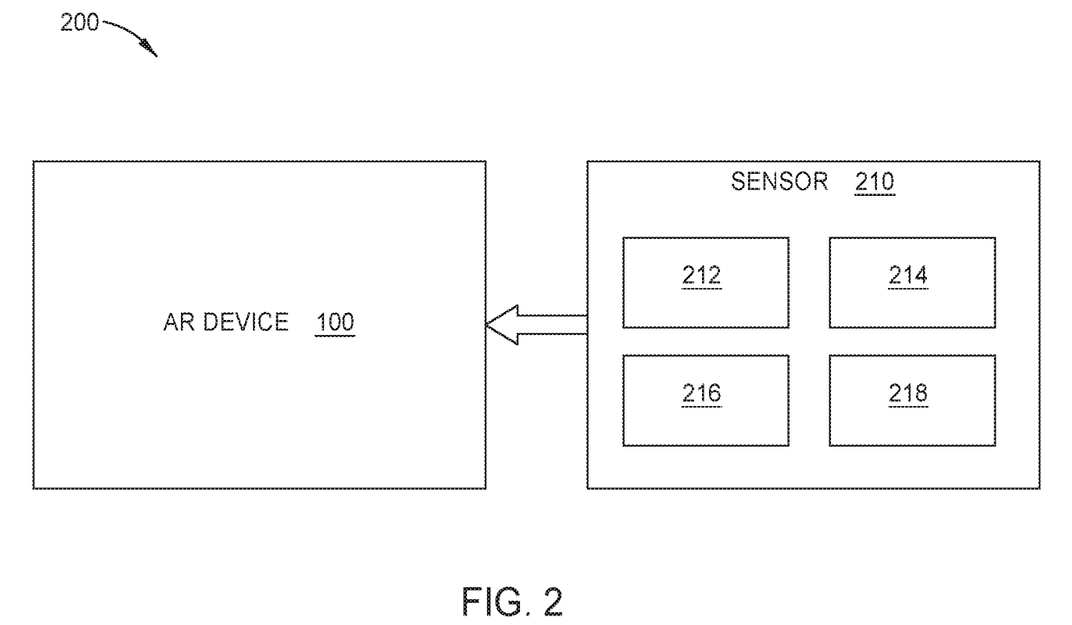
FIG. 2 is an example augmented reality sensing system, according to one or more embodiments.

FIG. 2 illustrates an AR sensing system 200, according to one or more embodiments. The AR sensing system 200 includes the AR system 100 and sensor 210. The sensor 210 is a device remote to the AR system 100 that transmits sensor data to the AR system 100. For example, the sensor 210 may be a magnetometer, accelerometer, a compass, or a light sensor, among others. In one embodiment, the sensor 210 is wireless connected to the AR system 100. For example, the sensor 210 may include a wireless transmitter 212. In one embodiment, the wireless transmitter is one of a Bluetooth transmitter, a Bluetooth Low Energy transmitter, and a Wi-Fi transmitter, among others. Further, in one embodiment, the sensor 210 is wirelessly connected with and transmits sensor data to the radio 150 of the AR system 100.

In one or more embodiments, the sensor 210 may be attached to a real-word object and the sensing data corresponds to the position or a change in the position of the real-world object. For example, in various embodiments, the sensor 210 may include an attachment mechanism 218. The attachment mechanism 218 may allow the sensor 210 to be attached to a real-world object (e.g., the door 302 of FIG. 3). The adhesive may form a permanent bond between the sensor 210 and a real-word object. Alternatively, the sensor 210 may be removably attached to a real-world object such that the sensor 210 may be attached and removed from a real-world object without damage to the sensor 210 or the real-world object. In various embodiments, the attachment mechanism 218 includes an adhesive, magnet, a suction, cup, a hook, a hook-and-loop fastener, a pin, or a screw, among others. In one or more embodiments, the attachment mechanism 218 may be integral to or separate from the sensor 210.

The sensor 210 may include a power source 214. The power source 214 may be a radio frequency (RF) power source 214. For example, the RF power source 214 may convert RF signals into power signals utilized to operate the sensor 210. In one embodiment, the RF signals are provided by an RF generator positioned proximate to the sensor 210. Alternatively, the power source 214 may be an alternating current (AC) power source or a direct current (DC) power source. Further, the power source 214 may be a rechargeable or non-rechargeable power source.

In various embodiments, the sensor 210 continuously transmits sensor data. In one or more embodiments, the sensor 210 transmits data in response to a connection being formed with an AR device (e.g., AR system 100), and stops transmitting data in response to a termination of a connection between the sensor 213 and an AR device (e.g., the AR system 100). In other embodiments, the sensor 210 transmits sensor data in response to an event associated with a corresponding real-world object. For example, the sensor 210 may transmit sensor data in response to a change of a position of a real-world object.

In various embodiments, the sensor 210 includes an optional receiver 216. The receiver 216 may receive commands or instructions from an external source (e.g., the AR system 100 or another device). For example, the receiver 216 may receive instructions instructing the sensor 210 to begin or cease transmitting sensor data. Further, the receiver 216 may receive instructions to pair (e.g., connect) the sensor 210 with another device (e.g., the AR system 100).

In one or more embodiments, the sensor 210 may be simultaneously connected to multiple devices. For example, the sensor 210 may be simultaneously connected to multiple AR devices. Further, in one or more embodiments, the sensor 210 automatically connects to an AR device when the AR device enters within communication range of the sensor 210.

Figure 3:
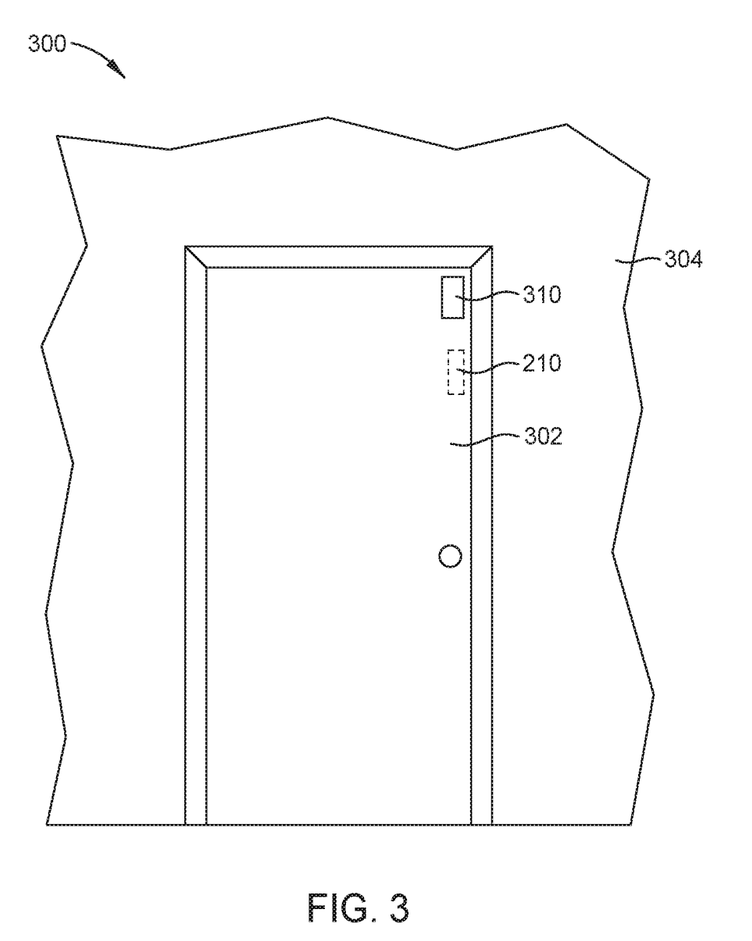
FIGS. 3, 4, and 5 illustrate various real-world environments, according to one or more embodiments.

FIG. 3 illustrates a real-world environment 300, according to one or more embodiments. The real-world environment 300 includes real-world objects 302, 304 and the sensor 210. The sensor 210 is illustrated as being in phantom as the sensor 210 is occluded by the door 302. In one embodiment, the sensor 210 is attached to at least one of the real-world objects 302, 304. In other embodiments, the sensor 210 is attached to both of the real-world objects 302, 304. For example, a first portion of the sensor 210 is coupled to the door 302 and a second portion of the sensor 210 is coupled to the real-world object 304.

The sensor 210 may be a magnetometer, where a first portion of the sensor is attached to the real-world object 302 and a second portion of the sensor is attached to the real-world object 304. For example, the real-world object 302 may be a door and the real-world object 304 may be a wall and the sensor 210 transmits sensor data corresponding to a change in an angular position of the door 302 with regard to the wall 304. For example, the sensor data may correspond to the door 302 changing from a closed position to an opened position or from the opened position to the closed position. In one embodiment, the magnetometer may instead be one or more Hall Effect sensors. However, in other embodiments, other types of sensing devices may be utilized or a combination of different types of sensing devices may be utilized.

Figure 7:
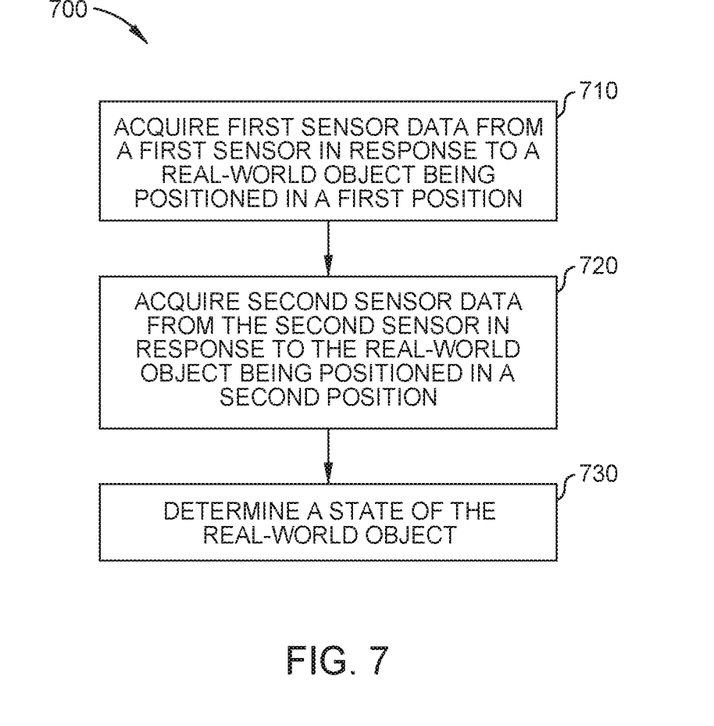

In one or more embodiments, the determination of an open or closed real-world object (e.g., door 302) may be based on an initial calibration procedure as is described in FIG. 7. For example, in one embodiment, the sensor 210 is attached to the door 302 and initiates the AR application 121 to start a calibration procedure. In one embodiment, during calibration the door 302 is placed in an open position and first sensor data is acquired from the sensor 210 and the door 302 is placed in a closed position and second sensor data is acquired from the sensor 210. As is described in the description of FIG. 7, the first and second sensor data may be used to determine when the door 302 is in an open position and when the door 302 is in a closed position. In other embodiments, the door 302 may be positioned in other positions (e.g., in a position between an open position and a closed position) and corresponding sensing data may be acquired and utilized to determine when the door 302 is placed in those positions.

In one or more embodiments, more than one sensor may be attached to the real-world objects. For example, the sensor 210 and the sensor 310 may be attached to the door 302. The sensor 210 may be a first sensor type and the sensor 310 may be a second sensor type. For example, the sensor 210 may be a magnetometer and the sensor 310 may be a compass. Further, the sensor 310 may be configured similar to that of the sensor 210. Each of the sensors (e.g., the sensor 210 and 310) may be connected with the AR system 100. Each sensor 210, 310 may be independently connected to the radio 150 of the AR system 100. In one embodiment, the sensor 210 provides sensor data indicating a position or change in position of the door 302 relative to the wall 304 and the sensor 310 provides sensor data indicating a rotation of the door 302 relative to the wall 304.

In one or more embodiments, one or more environmental maps 122 are updated based on the sensor data. For example, one or more environmental maps 122 may be updated to show a change of position of one or more real-world objects and/or the inclusion or exclusion of real-world or virtual objects based on the change in position of a real-world object.

Figure 4:
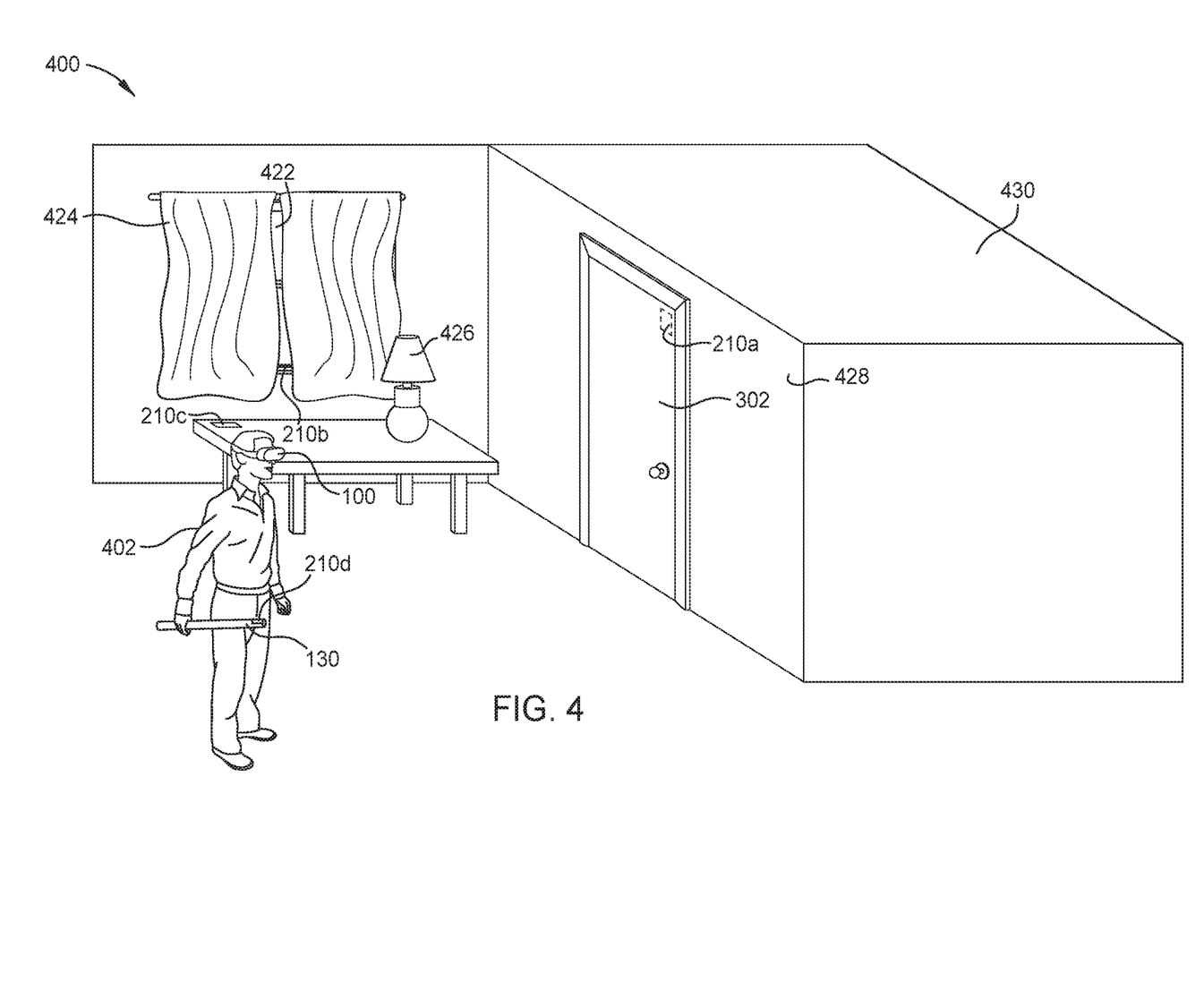

FIG. 4 illustrates a real-world environment 400, according to one or more embodiments. The real-world environment 400 includes real-world objects 302, 422, 424, 426, 428, 430, and 432. The real-world objects 302, 422, 424, 426, 428, 430, and 432 may be depicted as AR representations (e.g., an AR overlay) in a corresponding one or more environmental maps 122. In another embodiment, the real-world objects 302, 422, 424, 426, 428, 430, and 432 are viewable through the display 170 and virtual or AR elements are overlaid onto the display 170. In one embodiment, the door 302 is able to move from a first position (e.g., a closed position) to a second position (e.g., an open position). The door 302 is positioned along wall 428 of the room 430 and, when in the closed position, prevents objects within the room 430 from being seen by the user 402 or passing through the corresponding doorway. For example, when in the first position, the door 302 occludes one or more objects (virtual objects or real-world objects) from the user 402. As such, those objects are not included within an environmental map 122.

As shown, the sensor 210a is attached to the door 302. The sensor 210a is configured similar to that of the sensor 210. For example, the sensor 210a is wirelessly connected the AR system 100 and transmits data to the AR system 100 corresponding to a position or a change of a position of the door 302. In one embodiment, the sensor 210a is one of a magnetometer, an accelerometer, or a gyroscope, among others.

The real-world environment 400 further includes a window 422 and the sensor 210b. The sensor 210b may be coupled to or proximate the window 422. In one embodiment, the sensor 210b detects the position of the window 422 or a change in a position of the window 422. For example, the sensor 210b may be able to detect when the window 422 is an opened position or in a closed position. Further, the sensor 210b may detect a change in the position of the curtains 424. In one embodiment, the sensor 210b is one of an accelerometer, hall effect sensor, capacitive sensor, potentiometer, an optical tracking device, or a light emitter/sensor, among others. In the embodiment of FIG. 4, the window 422 is illustrated as being in the closed position.

The real-world environment 400 further includes curtains 424. The curtains 424 may at least partially block the window 422. The curtains 424 may be moved from a first position (a closed position as currently shown) to a second position. Moving the curtains 424 between the first and second position alters the amount of the window 422 that is visible by the user 402. For example, the curtains alter the amount of light that enters the real-world environment 400 via the window 422. In one embodiment, the sensor 210b transmits sensor data corresponding to the position or the change in position of the curtains 424. Additionally, or alternatively, the real-world environment 400 includes the sensor 210c. The sensor 210c may be a light sensor configured to detect a change of illumination in the real-world environment 400. For example, the change in illumination may be in response to the curtains 424 moving from a closed position to an opened position or an opened position to a closed position such that the amount of light that enters the real-world environment 400 via the window 422 increases or decreases, respectively. Further, the sensor 210c may be configured to detect a change in illumination caused by the lamp 426 being turned on or turned off. The sensor data from the sensor 210c is communicated to the AR system 100 such that the environmental map 122 may be updated with the change in illumination or a color of the illumination.

In one or more embodiments, the user 402 may hold an input controls 130. For example, the input controls 130 may be a joystick or another type of game piece that allows the user 402 to interact with the corresponding virtual environment. The input controls 130 may include one or more buttons or other input devices. Further, the sensor 210d is provided on the input controls 130. The sensor 210d may transmit sensor data corresponding to the position or a change in position of the input controls 130. In one embodiment, the sensor 210d is one of an accelerometer and a gyroscope, among others.

In various embodiments, multiple sensors of the same or a different type may be attached to one or more of the real-world objects. In one or more embodiments, sensors of the same type may be used for redundancy in the event that one or more sensors fail or as to confirm the accuracy of the sensor data of the sensors. Further, by using different types of sensors, different types of sensor data may be transmitted to the AR system 100. For example, a magnetometer and a hall effect sensor or a potentiometer may be attached to the door 302. The magnetometer may transmit data corresponding to the angular position of the door 302 relative to the wall 428 and the Hall Effect sensor or the potentiometer may transmit data corresponding to the door 302 being in a closed position or in an opened position.

Figure 5:
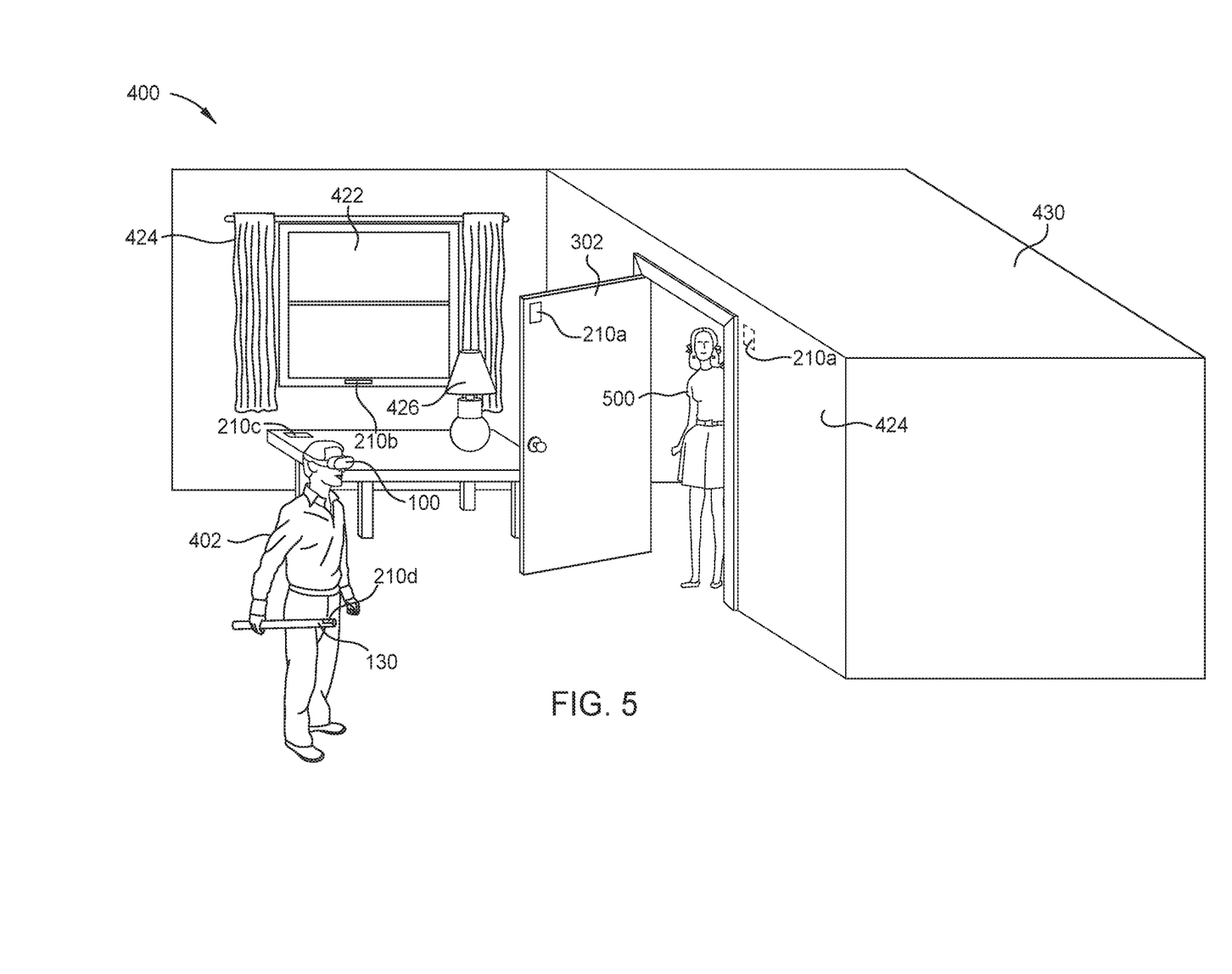

FIG. 5 illustrates the real-world environment 400, according to one or more embodiments. As illustrated in the embodiment of FIG. 5, the state of one or more real-world objects (e.g., the door 302, the window 422, the curtains 424, and the lamp 426) differs from that of the corresponding real-world object of FIG. 4. For example, as compared to the embodiment of FIG. 4, the door 302 in the embodiment of FIG. 5 is an opened position. Accordingly, one or more objects that were occluded by the door 302 in the embodiment of FIG. 4 are now visible. For example, the person 500 is visible in the embodiment of FIG. 5 and may be rendered within the environmental map 122 utilized by the AR system 100. The person 500 may be a real-world object or a virtual object (e.g., AR overlay) within the environmental map 122.

Further, as illustrated in the embodiment of FIG. 5, the curtains 424 have been placed in an opened position. The change in position of the curtains 424 may be reported within sensor data of the sensor 210b and/or the sensor 210c. The amount of the window 422 that is visible is larger than that of the embodiment of FIG. 4. Further, a change in illumination due to the change in position of the curtains 424 may be reflected within an environmental mapping 122 based on the senor data transmitted by sensor 210b or 210c. In various embodiments, the change in illumination may occur even when the user 402 is facing away from the window 422 and such that a change in position of the curtains 424 is not visible to the user 402. Further, volumetric lighting (e.g., light entering through the window 422) may be incorporated within the environmental map 122 to provide a more realistic illumination of virtual objects within the environmental map 122. In various embodiments, the virtual lighting within the environmental map 122 may simulate illumination associated with a first time of day (e.g., day time or night time) and may be updated based the amount and time of light entering through the window 422 determined from sensor data received from the sensor 210c. Further, the AR representation of the window 422 may be modified based on the position of the curtains 424 as more of the window 422 is visible in FIG. 5 as compared to the embodiment of FIG. 4.

Figure 6:
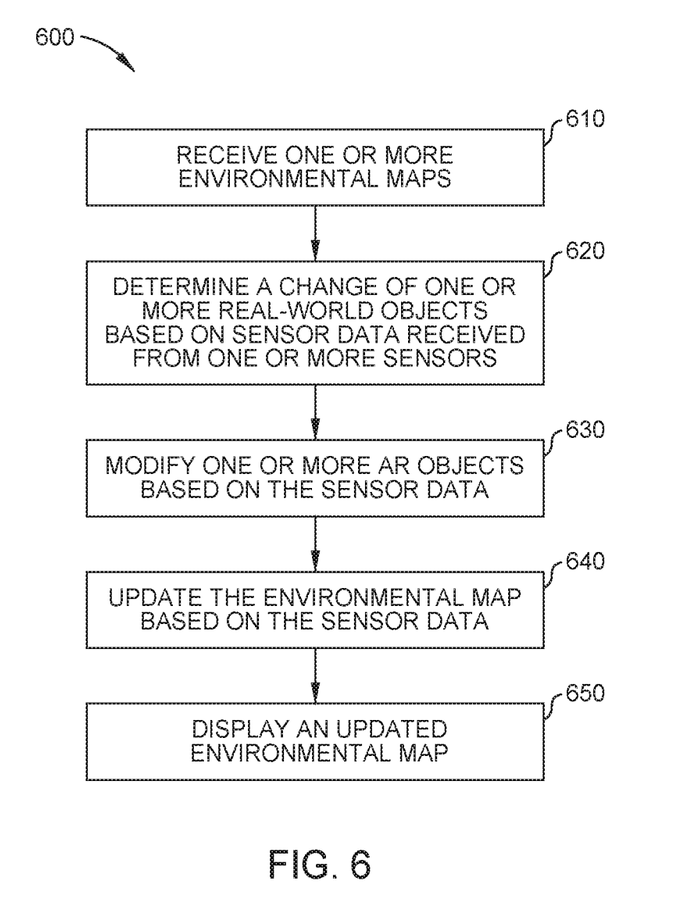
FIGS. 6 and 7 are flow charts of method for interacting with an augmented reality system, according to one or more embodiments.

FIG. 6 is a flow chart of a method 600 for updating an environmental map (e.g., the environmental map 122), according to one or more embodiments. At operation 610, an AR application 121 receives one or more environmental maps 122 with various real-world objects represented as AR representations within the environmental maps 122. For example, the door 302, the window 422, the curtains 424, the lamp 426, and the wall 428 may be represented as AR objects in the one or more environmental maps 122. In one embodiment, the door 302 may be represented as a black cube within the one or more environmental maps 122. Additionally, the amount of illumination or the color of light generated within the one or more environmental maps may correspond to the position of the curtains 424 and/or the amount of or color of light produced by the lamp 426. In various embodiments, the door 302 and the wall 428 prevent a virtual or physical object within the room 430 from being included within the one or more environmental maps and from being visible to the user 402.

At operation 620, the radio 150 receives sensor data from one or more sensors. Further, the AR application 121 determines a change of one or more real-world objects based on the sensor data. For example, the sensor data may be received from the sensor 210a, and the AR application 121 may determine that the door 302 changed from a closed position and an opened position or from an opened position to a closed position. Further, the sensor data may be received from the sensor 210b, and the AR application 121 may determine that curtains 424 changed from a closed position to an opened position or from an opened position to a closed position. Additionally, the sensor data may be received from the sensor 210c and the AR application 121 may determine that the amount of light produced by either the window 422 and/or lamp 426 has increased or decreased.

In various embodiments, sensor data may be received from one or more sensors (e.g., the sensors 210a, 210b, and/or 210c). The sensor data may be received from one or more of the sensors 210a, 210b, and/or 210c simultaneously. Further, the AR system 100 may receive sensor data from any one or more of the sensors 210a, 210b and/or 210c when the user 402 is within a transmission range of the one or more sensors.

At operation 630, one or more AR objects within the environmental map 122 is updated by the AR application 121 based on sensor data received from one or more of the sensors 210a, 210b and 210c. For example, the environmental map may be updated to depict the AR representation of door 302 (e.g., a transparent cube) as being in an opened position in response to the sensor data received from the sensor 210a. Alternatively, the environmental map may be updated to depict the AR representation of the door 302 (e.g., a black cube) as being in a closed position in response to the sensor data received from the sensor 210a. In various embodiments, the environmental map 122 is updated by the AR application 121 to depict the AR representation of the curtains 424 as being in the open position and to depict an increased illumination in response to sensor data received from one or more of the sensors 210b and 210c. Further, the color of illumination within the one or more environmental maps 122 may be changed based on the sensor data received from one or more of the sensors 210b and 210c.

At operation 640, the AR application 121 updates the environmental map 122 based on sensor data. For example the AR application 121 may update an AR representation of one or more new-world objects within the environmental map 122 in response the sensor data from one or more of the sensors 210a, 210b, and 210c. For example, a determination may be made that the door 302 is open based on the sensor data received from the sensor 210a, and in response, one or more real-world objects (e.g., the person 500) or AR objects occluded by the door 302 when the door is in the closed position is visible by the user 402. Accordingly, an AR representation of such real-world objects (e.g., the person 500) or AR objects may be added to the environmental map 122. Further, the person 500 may be allowed to move within the environmental map 122. In one embodiment, if the person 500 is a computer generated virtual opponent in a game, the person 500 is allowed to move within the environmental map 122 and engage the user 402 in response to the door 302 being positioned in an open position.

In various embodiments, the illumination depicted within the one or more environmental maps 122 may be adjusted in response to the sensor data receive from the sensor 210b and/or the sensor 210c. For example, the amount of and/or color of the illumination may be adjusted within the one or more environmental maps 122. In one embodiment, the illumination depicted within the environmental map 122 may be adjusted regardless of the position of the user 402 and the AR system 100. For example, the illumination of the environmental map 122 may be adjusted even when the user 402 and the AR system 100 faces away from the lamp 426 and/or the window 422.

At operation 650, the updated environmental map 122 is displayed on the display 170. For example, the updated environmental map 122 that includes one or more occluded or visible AR objects (e.g., the person 500) is displayed on the display 170.

FIG. 7 illustrates a flow chart for calibrating one or more sensors (e.g., the sensor 210, 310, 210a, 210b, 210c and 210c) according and determining the position of one or more real-world objects, according to one or more embodiments. At operation 710, first calibration sensor data is received from a sensor in response to a real-world object being placed in a first state. In one embodiment, first calibration sensor data may be received from the sensor 210a when the door 302 is placed in a closed position. Further, first calibration sensor data may be received from the sensor 210b when the curtains 424 are placed in a closed position. Further, first calibration sensor data may be received from sensor 210c when the curtains 424 are in a closed position and/or the lamp 426 is turned off.

At operation 720, second calibration sensor data is received from a sensor in response to a real-world object being placed in a second state. In one embodiment, second calibration sensor data may be received from the sensor 210a when the door 302 is placed in an opened position. Further, second calibration sensor data may be received from the sensor 210b when the curtains 424 are placed in an opened position. Further, second calibration sensor data may be received from sensor 210c when the curtains 424 are in an opened position and/or the lamp 426 is turned off.

At operation 730, the AR application 121 determines the state of one or more real-world objects from received sensor data. For example, the AR application 121 may determine that the door 302 is in one of an opened position or a closed position based on a comparison of received sensor data from the sensor 210a to the corresponding first and second calibration sensor data. Further, the AR application 121 determines a change in position of the door 302 between a closed position and an open position based on a comparison of received sensor data from the sensor 210a to the corresponding first and second calibration sensor data. In one or more embodiments, the AR application 121 may determine that the curtains 424 are in one of an opened position and a closed position based on a comparison of received sensor data from the sensor 210b to the corresponding first and second calibration sensor data. Further, the AR application 121 determines a change in position of the curtains 424 between a closed position and an open position based on a comparison of received sensor data from the sensor 210b to the corresponding first and second calibration sensor data. Additionally, the AR application 121 may determine that lamp 426 is turned on or turned off based on a comparison of the received sensor data from the sensor 210c to the corresponding calibration sensor data. In various embodiments, the AR application 121 determines that lamp 426 switched between from being turned off to being turned on based on a comparison of the received sensor data from the sensor 210c to the corresponding calibration sensor data.

In various embodiments, pre-defined profiles with corresponding sensor data may be utilized to determine the state of a real-world object. The pre-defined profiles may be generated for commonly used real-world objects (e.g., doors and/or windows) and the sensor data of the pre-defined profiled may be used as is described above to determine the state of a corresponding real-world object. The pre-defined profiles may be determined by completing the operations 710 and 720 for each real-world object for which a pre-defined profile is to be created. The pre-defined profiles include sensor data corresponding to two or more states of a real-world object. Further, the pre-defined profiles may be accessible by the AR application 121 when a corresponding real-world object is detected or indicated as being part of the environmental map 122. In one or more embodiments, the AR application 121 may update the environmental map 122 in response to a comparison of received sensor data to the sensor data of the corresponding pre-defined profiles to determine a position or state of a real-world object.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for updating an environmental map of an augmented reality (AR) system, the method comprising:
   receiving first sensor data, first calibration data, and second calibration data from a first sensor attached to a first physical object in physical space, wherein the first calibration data corresponds to a first state associated with a first position of the first physical object in the physical space, and the second calibration data corresponds to a second state associated with a second position of the first physical object in the physical space, the first position differing from the second position;
   determining a change from the first state to the second state based on a comparison of the first sensor data to the first calibration data, and a comparison of the first sensor data to the second calibration data;
   receiving second sensor data from a second sensor in the physical space;
   determining a change of an amount of light within the physical space based on the second sensor data;
   updating a first virtual object corresponding to the first physical object within the environmental map based on the change from the first state to the second state;
   updating illumination within the environmental map based on the change of the amount of light within the physical space;
   updating a second virtual object within the environmental map based on the second sensor data, wherein the second virtual object corresponds to a second physical object within the physical space; and
   updating a presentation based on the updated first virtual object, the updated second virtual object, and the updated illumination.

2. The method of claim 1, wherein the first sensor is powered via a wireless radio frequency power source.

3. The method of claim 1 further comprising:
   adding a third virtual object within the environmental map based on the change from the first state to the second state, wherein the third virtual object was occluded by the first physical object when the first physical object was in the first position but is not occluded when the first physical object is in the second position; and
   updating the presentation based on adding the third virtual object to the environmental map.

4. The method of claim 1, wherein updating the illumination within the environmental map based on the change of the amount of light within the physical space comprises:
   adjusting at least one of an illumination intensity and an illumination color.

5. The method of claim 1, wherein the first sensor is one of a Hall Effect sensor, a magnetometer, a light sensor, an accelerometer, a potentiometer, a capacitive sensor, and a color sensor.

6. The method of claim 1, wherein the first sensor is removable attached to the first physical object.

7. The method of claim 1, wherein the first sensor data is transmitted in response to the AR system wirelessly connecting to the first sensor.

8. The method of claim 1, wherein the second sensor is attached to the second physical object in the physical space and is configured to detect the change of the amount of light within the physical space.

9. The method of claim 8, wherein
   determining the change of the amount of light within the physical space based on the second sensor data comprises determining a change from a third state of the second physical object to a fourth state of the second physical object based on the second sensor data, wherein the third state corresponds to a first amount of light, and the fourth state corresponds to a second amount of light, and wherein updating the illumination within the environmental map based on the change of the amount of light within the physical space comprises:
   adjusting an illumination intensity based on the change of the amount of light within the physical space.

10. A non-transitory computer-readable medium containing computer program code that, when executed by operation of one or more computer processors, performs an operation comprising:
   receiving first sensor data, first calibration data, and second calibration data from a first sensor attached to a first physical object in physical space, wherein the first calibration data corresponds to a first state associated with a first position of the first physical object in the physical space, and the second calibration data corresponds to a second state associated with a second position of the first physical object in the physical space, the first position differing from the second position;
   determining a change from the first state to the second state based a comparison of the first sensor data to the first calibration data, and a comparison of the first sensor data to the second calibration data;
   receiving second sensor data from a second sensor in the physical space;
   determining a change of an amount of light within the physical space based on the second sensor data;
   updating a first virtual object corresponding to the first physical object within an environmental map based on the change from the first state to the second state;

updating illumination within the environmental map based on the change of the amount of light within the physical space;
updating a second virtual object within the environmental map based on the second sensor data, wherein the second virtual object corresponds to a second physical object within the physical space; and
displaying the updated first virtual object, the updated second virtual object, and the updated illumination on a display of an augmented reality system.

11. The non-transitory computer-readable medium of claim 10, wherein the first sensor is powered via a wireless radio frequency power source.

12. The non-transitory computer-readable medium of claim 10, wherein the operation further comprises:
adding a third virtual object within the environmental map based on the change from the first state to the second state, wherein the third virtual object was occluded by the first physical object when the first physical object was in the first position but is not occluded when the first physical object is in the second position; and
displaying the third virtual object as AR content based on adding the second virtual object to the environmental map.

13. The non-transitory computer-readable medium of claim 10, wherein updating the illumination within the environmental map based on the change of the amount of light within the physical space comprises:
adjusting at least one of an illumination intensity and an illumination color.

14. The non-transitory computer-readable medium of claim 10, wherein updating the environmental map based on the change from the first state to the second state comprises changing a position of the first virtual object in the environmental map.

15. An augmented reality system, comprising:
a display;
a radio configured to:
receive first sensor data, first calibration data, and second calibration data from a first sensor attached to a first physical object in physical space, wherein the first calibration data corresponds to a first state associated with a first position of the first physical object in the physical space, and the second calibration data corresponds to a second state associated with a second position of the first physical object in the physical space, the first position differs from the second position; and
receive second sensor data from a second sensor in the physical space; and
a processor configured to:
determine a change from the first state to the second state based on a comparison of the first sensor data to the first calibration data, and a comparison of the first sensor data to the second calibration data;
determine a change of an amount of light within the physical space based on the second sensor data;
update a first virtual object corresponding to the first physical object within an environmental map based on the change from the first state to the second state;
update illumination within the environmental map based on the change of the amount of light within the physical space;
update a second virtual object within the environmental map based on the second sensor data, wherein the second virtual object corresponds to a second physical object within the physical space; and
displaying the updated first virtual object, the updated second virtual object, and the updated illumination on the display.

16. The augmented reality system of claim 15, wherein the first sensor is powered via a wireless radio frequency power source.

17. The augmented reality system of claim 15, wherein the first sensor is one of a Hall Effect sensor, magnetometer, a light sensor, an accelerometer, a potentiometer, and a color sensor.

18. The augmented reality system of claim 15, wherein the processor is further configured to:
add a third virtual object within the environmental map based on the change from the first state to the second state, wherein the third virtual object was occluded by the first physical object when the first physical object was in the first position but is not occluded when the first physical object is in the second position; and
display the third virtual object as AR content based on adding the second virtual object to the environmental map.

19. The augmented reality system of claim 15, wherein updating the illumination within the environmental map based on the change of the amount of light within the physical space comprises:
adjusting at least one of an illumination intensity and an illumination color.

* * * * *

UNITED STATES PATENT AND TRADEMARK OFFICE
CERTIFICATE OF CORRECTION

PATENT NO. : 11,216,665 B2  
APPLICATION NO. : 16/541910  
DATED : January 4, 2022  
INVENTOR(S) : Corey D. Drake et al.

It is certified that error appears in the above-identified patent and that said Letters Patent is hereby corrected as shown below:

In the Drawings

On sheet 1 of 7, in Figure 1, reference numeral 162, Line 1, delete "ACCELEROMOETER" and insert -- ACCELEROMETER --.

In the Claims

In Column 14, Line 58, in Claim 10, after "based" insert -- on --.

Signed and Sealed this
Seventeenth Day of May, 2022

Katherine Kelly Vidal
*Director of the United States Patent and Trademark Office*